Patented Aug. 15, 1950

2,518,510

UNITED STATES PATENT OFFICE 2,518,510

STABLE INJECTABLE OIL-PECTIN THERAPEUTIC COMPOSITIONS

Henry Welch, Silver Spring, Md., assignor to the United States of America

No Drawing. Application August 25, 1947, Serial No. 770,558

4 Claims. (Cl. 167—82)

(Granted under the act of March 3, 1883, as amended April 30, 1928; 370 O. G. 757)

My invention relates to a novel pectin preparation and novel process for production thereof.

This application is a continuation in part of application Serial No. 752,298, filed June 3, 1947, now Patent No. 2,491,537. In that application I described a number of pectin preparations suitable for prolonging the effective therapeutic blood level concentration.

As there described, many expediencies have been proposed directed to the end of maintaining an effective therapeutic penicillin blood level concentration for a prolonged period of time. These include continuous intravenous injections, continuous intramuscular administrations, the establishment of an excretory blockade in the patient by the simultaneous administration of para-aminohippuric acid or diodrast and the use of ice packs at the site of intramuscular injection. Prolongation of therapeutic activity has also been attempted with various slowly absorbed vehicles, such as peanut oil and beeswax, globin and the like.

With certain of these vehicles, such as globin and the like, prolonged action of penicillin in the blood is not obtained to a sufficient degree.

The development of penicillin in oil and wax overcame the rapid absorption of penicillin but manifested other disadvantages. When penicillin is suspended as a dry salt (e. g., calcium salt) in oil with beeswax and injected into the body, a mass is formed in the tissues consisting of beeswax in which penicillin is entrapped. Water from the tissues gradually dissolves out the penicillin from this beeswax matrix and in a matter of 20 to 24 hours the penicillin has been completely absorbed, although the beeswax itself remains for some time in the tissue.

Beeswax is a well-known sensitizer and thus produces allergic reactions when injected into the body in combination with peanut oil and penicillin. Because of its structure (i. e., insolubility in tissue fluids), beeswax is absorbed with great difficulty by the human body requiring on an average from twenty-five to thirty days to be assimilated by the body. Furthermore, sterile abscesses are frequently formed by beeswax preparations and moreover are painful at the site of injection for prolonged periods. There is, therefore, need for a preparation which will prolong the activity of penicillin in the body while avoiding the disadvantages of the beeswax preparation.

I have discovered that some hydrophilic substances, particularly pectin, which is readily digested and assimilated by the body, form a gel-like structure on contact with water in the body tissue. If a therapeutic product such as penicillin is injected intramuscularly with a hydrophilic substance such as pectin, the colloidal gel formed by the pectin entraps the penicillin. As further water reaches the colloidal gel, it is slowly dissolved resulting in a corresponding slow release of the penicillin.

Clinical data of the product described in the above identified application and made in accordance with the process described has shown that desired blood levels were secured for at least a twenty-four hour period and that there was no toxic effects.

Essentially one of the products described comprised a mixture of dry pectin and penicillin suspended in an oil. Such products are bottled and reach the physician who is to administer it a considerable time, usually many months, after manufacture. The physician prefers that it be instantly ready for injection without any mechanical manipulations.

It is accordingly desirable that any such product should be substantially stable, i. e., that the dry ingredients should remain in suspension in the oil. I have discovered that such stability can be secured by a control of the viscosity of the mix including a control of the particle size of the pectin and penicillin. When this particle size is sufficiently small, these dry ingredients tend to remain in suspension rather than settling.

In general, my invention contemplates a stable mix of the products described in the above identified application by utilizing an oil carrier having a predetermined viscosity. Thus if peanut oil is used, I add in addition thereto a small percentage of acid-free hydrogenated peanut oil.

Inasmuch as the essence of the invention resides in the avoidance of the painful effects of the beeswax preparations heretofore used, care must be used in the hydrogenated oil employed. It must be acid free and used in limited proportions since it otherwise will produce the same painful results as was experienced with the beeswax preparations.

Accordingly objects of my invention are to provide a novel stable hydrophilic (pectin) preparation and a novel process for producing the same; to provide a stable pectin product and process therefor which prolongs therapeutic blood levels and to provide micron particle mixes of pectin, in an oil solution of a desired viscosity.

These and other objects will be clear from the detailed description which follows.

As described in the parent application, the preferred embodiment of the hydrophilic agent employed is preferably pectin. This is mixed in the dry state using particles which have a size of approximately 50 microns with dry penicillin in a vegetable oil and a hydrogenated vegetable oil. To ensure that no moisture is accidentally absorbed by the dry ingredients, the processing of the preparation is carried in a humidity controlled room where it is possible to maintain a relative humidity on the order of 10%.

Thus the vegetable oil used, the hydrogenated oil used, and the penicillin used all must be so treated as to contain 1% moisture or less. As stated above, in order to secure stability, i. e., prevent settling of the pectin or penicillin, it is desirable that these ingredients be of the smallest practical particle size without of course destroying their necessary properties.

Inasmuch as the dry pectin after suspension in oil with penicillin is to be injected into the muscle or subcutaneously, the particle size of the pectin and penicillin must be such that it will pass through a 20-gauge needle without difficulty. So far as the pectin is concerned, it may thus be of any size under that which will pass through a 20-gauge needle, but the size of the penicillin is more critical and besides the upper limit governed by the needle bore, it has been found that the smaller the penicillin particles, the less efficacious it is in prolonging blood concentrations following injection.

It has been found that when the penicillin particle size is on the order of from 50 to 100 microns, the most efficient results are obtained. Penicillin of this particle size is obtained by grinding in a suitable mill and passing through a 140 mesh screen. There may a few particles as large as 300 to 400 microns in a batch. However, these do not cause plugging of a 20-gauge needle. Indeed, a larger bore needle, i. e., 19, 18, or 17 gauge, may be used for injection and thus obviate any difficulty even with particles of penicillin 400 microns in diameter.

The pectin is also ground in a mill to the desired size. As already stated, when pectin of particle size of approximately 50 microns is used, shelf tests show that some settling of the pectin takes place within a relatively short time.

I have found that this settling can be avoided by utilizing pectin of fine particle size. Such pectin is obtained by lowering the temperature of pectin until it becomes brittle and grinding the pectin in this condition. To this end I mix the pectin with small pieces (¼ inch) of Dry Ice and chill it for ½ to ¾ of an hour. When the pectin has thus become brittle, I grind it in a hammer mill and pass the ground product through a 250 mesh screen utilizing only that material which passes the screen. The carbon dioxide gas is eliminated by the process of drying the pectin in a vacuum oven at a temperature of 60° C. to 100° C., being careful not to overheat the pectin which would thus cause the loss of some of its essential properties here.

The settling of the pectin is further overcome by increasing the viscosity of the vegetable oil by addition to it of hydrogenated peanut oil or other hydrogenated oils. Such hydrogenated oil, however, must be pure and contain relatively no free acids (less than .05%) since the presence of such acids cause considerable pain to the patient on injection. As a matter of fact, the vegetable oil itself must also be similarly relatively free from such free acids.

Another process for preventing settling of the pectin entails use of extremely small particles (as small as from 0.1 to 0.5 micron averaging about 1 micron) of pectin without the necessary addition of hydrogenated oil. In the latter case the pectin particles are so minute that the normal viscosity of the oil overcomes the pull of gravity on them. This procedure is carried out as follows:

Twenty grams of pectin is dissolved in 400 cc. of water. The solution of pectin in water may be obtained by beating for a short period of time (1 to 2 minutes in a Waring blendor). Following this, 400 cc. of 95 percent ethyl alcohol is added to the solution of pectin and water (equal volume). This solution of pectin in water plus alcohol is again blended for 1 to 2 minutes in a Waring blendor. The pectin which is insoluble in alcohol is precipitated by the alcohol. To this mixture is added 100 cc. of sesame oil or peanut oil and the whole is again blended in a Waring blendor for a sufficient period of time (1 to 3 minutes) to obtain a white emulsion of oil and water and alcohol with pectin. At this point a small quantity of the material examined microscopically for the presence of particulate pectin shows particle size to be uniformly from 0.1 to 1.0 micron in diameter. Since in this process the pectin gel is being transformed from a solid solution to particulate pectin (in other words being precipitated), it is necessary to make a microscopic examination to be assured that all of the pectin in solid solution has been carried to the colloidal suspension state. If on the first microscopic examination, described above, particulate size particle pectin has been obtained only in part, alcohol (95 percent ethyl alcohol) should be added followed by further blending in a Waring blendor until such particulate pectin is obtained.

The suspension of pectin in alcohol, water and sesame oil is now placed in a large distilling flask under vacuum and completely deaerated. The distilling apparatus, still under vacuum, is placed in a water bath at 90° C. and distillation continued at approximately this temperature (85° to 95° C.) until all alcohol and water is removed. The final suspension of pectin in oil should contain not more than 1 percent moisture. During the distillation process, many of the fine pectin particles aggregate in clumps. This, however, is not a deterrent to the final preparation, since the pectin suspension in oil may be later homogenized by use of a Waring blendor or other similar apparatus.

After the moisture and alcohol have been completely removed from the pectin in oil suspension, the suspension is vigorously homogenized to produce an even, smooth suspension of pectin in oil. For each 200 milligrams of the pectin utilized in the preparation of the above particulate size pectin in oil, is added 180 milligrams of sodium crystalline penicillin (plus 10 percent overage). This combination of penicillin and pectin in oil is then vigorously milled to form a uniform suspension. The final product is then filled aseptically into containers for clinical use. This suspension does not settle out on standing.

A second method for production of this particle size pectin eliminating alcohol is as follows:

Twenty grams of pectin is dissolved in 400 cc. of water. Solution of the pectin in water may be obtained by beating for a short period of time (1 to 2 minutes in a Waring blendor). To this solution is added 100 cc. of sesame or peanut oil and the whole is again blended in a Waring blendor for a sufficient period of time (1 to 3 minutes) to obtain a white emulsion of oil and water with pectin. At this point a small quantity of the material examined microscopically for the presence of particulate pectin will show particles uniformly from 0.1 to 1.0 micron in diameter. Here again, since in this process the pectin gel is being transformed from a solid solution to particulate pectin, it is necessary to make a microscopic examination to be assured that all of the pectin in solid solution has been carried to the colloidal suspension state. If on the first microscopic examination, described above, particulate size particle pectin has been obtained only in part, further milling of the suspension should be carried out until all of the gel has been transformed to a colloidal suspension of pectin. This suspension is placed in a large distilling flask under vacuum, deaerated, and the water removed. The final suspension should contain not more than 1 percent moisture. The process then follows as in the above case.

In the above I have described procedures for securing stability. As I have stated, stability is also achieved by a procedure using hydrogenated oil. The preferred method in the preparation of such pectin and penicillin in oil is as follows:

For each 300,000 units of penicillin (approximately 180 mg. of sodium penicillin and 162 mg. of potassium penicillin), 200 to 300 mg. of pectin (200 grade or better) is prepared. (I prefer to to use 270 mg.) The pectin must meet the requirements of the National Formulary.

Amounts less than 200 mg. of pectin tend to make a product less efficacious in prolonging blood concentrations of this drug and over 300 mg. of pectin tends to make the product so viscous that difficulty is had in preparation and injection of the product. The 270 mg. of pectin per each 300,000 units of penicillin is prepared by drying at a temperature of 60° to 100° C., being careful not to overheat the pectin since this causes discoloration and loss of its gel properties.

I prefer to heat at 100° C. intermittently for 2 to 3 hours at a time until the moisture content is reduced to 1% or less. Under controlled humidity of 10% relative humidity or less, the pectin is ground in a hammer mill or micropulverizer and passed through a 250 mesh screen to obtain a particle size of approximately 50 microns.

Grinding some types of pectin can in this case also be facilitated by the addition of small pieces of Dry Ice (¼" in diameter) chilling for ¾ of an hour followed by grinding Dry Ice and pectin together. The chilling in this case causes the pectin to become brittle and to grind more readily. The carbon dioxide and any residual moisture must be removed by vacuum drying. I prefer to use a vacuum oven at 60° C. and a relatively high negative pressure (approximately 100 microns of mercury).

The penicillin used is dried to a moisture content of 1% or less and passed through a 140 mesh screen to obtain a particle size of approximately 100 microns. Larger particle size penicillin would be more efficacious but here again as with the pectin, too large particle size causes difficulty in handling and in passage through relatively small bore needles (i. e., 20 gauge).

The two dry ingredients (pectin and penicillin) are milled together, always maintaining the above specified moisture content of 1% or less to make a homogeneous mixture and to this dry mixture is added sufficient sesame oil or peanut oil (other vegetable oils may be used), the latter oils containing from 5% to 10% hydrogenated peanut oil by volume to make a total quantity of 1 cc. for each 270 mg. of pectin plus 300,000 units of penicillin.

Other hydrogenated oils may be used also in place of hydrogenated peanut oil.

Inasmuch as the hydrogenated oils are solid, it is necessary to heat these oils to about 60° C. to melt and furthermore to heat the vegetable oil to which it is added to approximately the same temperature before addition to the dry ingredients (pectin and penicillin). Moreover, the temperature should be maintained during the filling operations into the syringes or cartridges from which the product is ejected.

Aseptic technique must be utilized throughout the preparation of the product to ensure its sterility. Both the vegetable oil used and the hydrogenated vegetable oil used must be relatively free from free acids (.05% or less) and have moisture contents of 1% or less.

Since the desired preparation for injection has a volume of 1 cc. and contains 300,000 units of penicillin, there are a number of factors that materially influence the making of the product. Thus, for example, if crystalline sodium penicillin is used in the product, 180 mg. are necessary to make 300,000 units, while if crystalline potassium penicillin is used, only approximately 162 mg. are needed.

On the other hand, if amorphous penicillin is used (e. g., calcium penicillin) the weight will depend on its purity; thus if such penicillin has a purity or potency of 1000 units per mg. (and this is a normal potency commercially) 300 mg. would have to be used in each 1 cc. to give 300,000 units per cc. Thus with amorphous penicillin the bulk of the penicillin itself increases the viscosity of the preparation and thus tends to regulate in part at least the quantities of pectin, oil and hydrogenated oil in the final mixture.

If in the preparation of penicillin in oil and pectin, 300,000 units of amorphous calcium penicillin having a potency of 1000 units per mg. is used in a total volume of 1 cc. a total of 300 mg. of the penicillin is necessary. Since 270 mg. of pectin is preferred, and this in itself effects the viscosity of the final preparation, it has been found that e. g. 10% hydrogenated peanut oil cannot be utilized in such a preparation because the viscosity is so great that difficulty is encountered on injection. (The product becomes a stiff paste that cannot be handled by the clinician.)

Thus when amorphous penicillin is used, it is necessary to use from 5% to 7.5% hydrogenated vegetable oil for stabilization purposes.

When crystalline penicillin is used in the preparation less difficulty is encountered since two factors are relatively fixed; i. e., the volume (1 cc.) and the weight of penicillin 162–180 mg. Thus it is possible to regulate the amount of pectin and hydrogenated oil within limits.

Both pectin and hydrogenated oils tend to prolong blood concentrations of penicillin although the latter was added to the preparation initially to increase the stability of the product, i. e., to prevent the settling of the pectin.

From experiments it has been shown that 4% or less of the hydrogenated peanut oil does not prevent settling of the pectin; thus the lower limit is fixed at 5%. Increasing quantities of this hydrogenated oil increases the viscosity so that at a 15% concentration in the presence of 200 mg. of pectin and 180 mg. of crystalline potassium penicillin, great difficulty is encountered in injecting the preparation. It may be assumed therefore that the upper limit of concentration of the hydrogenated peanut oil under these conditions is approximately 15%.

Because the success of the preparation is dependent on the formation of a gel with pectin in the muscle tissue utilizing the water from such tissue to form the gel, the greater the amount of pectin utilized, the stiffer the gel and the more prolonged the blood concentrations of penicillin entrapped in the gel. This has been taken into consideration in reaching a decision as to the quantities of pectin and hydrogenated oil to be utilized with a fixed amount of penicillin.

Thus to produce the most satisfactory product, the optimum amount of pectin should be used and this appears to be 270 mg. per cc. of preparation. However, sufficient hydrogenated oil must be added to prevent settling and although 5% will be satisfactory, the optimum amount appears to be from 7.5% to 10%.

In order to determine the effect of pectin on injection into the muscles of rabbits, three normal adult rabbits were injected intramuscularly in the right rear legs with 1 ml. of a suspension containing 300,000 units of potassium penicillin, 270 mg. of high-grade pectin, and sufficient sesame oil to make 1 ml. After 24 hours, palpation of the muscles at the site of injection showed no indication of nodules. The animals were sacrificed and the muscles injected were excised and observed grossly for evidence of residual pectin and oil, and for evidence of inflammation.

At the insertion of the hypodermic needles in the muscles, the usual traumatic injury was evident on gross examination. Further evidence of tissue damage was not observed. Deposits of oil were found but residual pectin could not be demonstrated. The picture observed is that which is found on injection of 1 ml. of sesame oil alone.

The same suspension was injected subcutaneously into two rabbits, one receiving the injection on the shaven back surface and the other on a similarly prepared area of the abdomen. Palpation in these areas 24 hours later showed no evidence of nodules. The rabbits were sacrificed and autopsied. Gross observation of the tissues into which the injection had been made revealed no abnormalities.

Since in no instance was it possible to demonstrate the presence of pectin following both subcutaneous and intramuscular injections, it seemed advisable to do further studies in which the injection would be traced by simultaneous injection of a dye. In these experiments a suspension of pectin (235 grade) was prepared in refined sesame oil and to it added .5% tartrazine (F. D. C. yellow). For a control, .5% solutions of tartrazine were prepared in sesame oil only. The rear legs of three rabbits were depilated and an injection consisting of 1 ml. of the pectin suspension containing the dye was injected intramuscularly into each leg. Each muscle was also injected in another area with a control suspension of the dye in sesame oil alone. Twenty-four hours later, all three animals were examined for evidences of nodule deposits of pectin. None were found. The three animals were sacrificed and the areas into which the injections had been made were located by tracing the dye. These muscle areas were removed and placed in 70% alcohol for pathological study.

Grossly, there appeared to be little or no irritation other than that apparently produced by the dye itself. In two animals, hemorrhagic areas were noted at the point of injection. These appeared to be a traumatic injury, resulting from the needle itself. Oil deposits were found but in no instance could residual pectin deposits be demonstrated. A comparison of the areas of the muscles injected with the dye alone with those areas of the muscle injected with the dye plus pectin indicated that less injury occurred with the combination of pectin and dye than with the dye alone. This was quite evident after the muscles had been fixed in formalin for paraffin sectioning. This result may be explained on a basis that the dye itself in the pectin preparation was slowly released from the repository site of injection.

In the above I have described the use of pectin penicillin. As I have already stated and as outlined in the parent application, the pectin preparation with other pharmaceutical products also produce prolongation of therapeutic effect. Thus the pectin or other similar hydrophilic product described in the parent application may be used with other antibiotics such as streptomycin, derived from streptomyces griseus; penicillin X, penicillin F, penicillin G, penicillin dihydro F, penicillin K, derived from various strains of penicillin notatum, and penicillin chrysogenum; bacitratcin, eumycin and subtilin, derived from B. subtilis and other similar mold or bacterial excretory products possessing antibiotic properties.

Both the mold and the bacterial excretory products may be in the form of salts such as penicillin sodium or penicillin calcium, streptomycin sulphate, streptomycin phosphate, streptomycin hydrochloride, streptomycin calcium chloride, trihydrochloride double salt, etc.

Drugs such as insulin, epinephrine, ephedrine and hormones, including estrin, estradiole and stilbesterol; vitamins such as folic acid, vitamin $B_1$ complex, vitamin C (ascorbic acid), liver extract and drugs where the therapeutic effect is to be prolonged, can also be made and used in accordance with this invention.

Thus in the case of streptomycin, 1 cc. of streptomycin pectin in oil consists of from 160 to 200 mg. (preferably 160 mg.) of pectin of a particle size of 50 microns (passing through a 250 mesh screen) containing less than 1% moisture and 400 to 500 mg. of activity of streptomycin of 100 micron particle size and containing less than 1% moisture.

In streptomycin, one half gram (500 mg.) of activity is actually equivalent to about 800 mg. of material. This is due to the fact that streptomycin base has an activity of 1000 micrograms per mg. and when the base is made into the salts which are streptomycin phosphate, streptomycin hydrochloride, streptomycin sulphate or streptomycin calcium chloride trihydrochloride (double salt) the added weight of the acids utilized in their preparation decreases the activity per mg.

Ideally for clinical reasons, ½ gram of activity per injection in 1 cc. should be used. Thus if approximately 800 mg. of a streptomycin salt (only 500 of which is active) is used and to this is added 200 mg. of pectin, there is already a total of 1000 mg. (1000 mg. of water is 1 cc.) to which there still must be added oil and hydrogenated oil. This is one reason that the preparation as described hereinafter has approximately 800 mg. of streptomycin, 160 mg. of pectin, and sufficient sesame oil to make 1 cc., the sesame oil containing 5% hydrogenated peanut oil.

The pectin used in this preparation is prepared in the same manner as that used in penicillin in pectin and oil, i. e., ground to proper particle size, sterilized by dry heat, and dried to a moisture content of 1% or less. The streptomycin is passed through a 140 mesh screen to obtain a particle size of approximately 100 microns, dried to a moisture content of 1% or less, and mixed thoroughly with the pectin. For each 0.4 to 0.5 gram of streptomycin is added 160 mg. of the above pectin. Sesame oil is heated to about 60° C. and to it is added 5% by volume of hydrogenated peanut oil at the same temperature. Maintaining approximately this temperature and for each 0.4 to 0.5 gram of streptomycin plus 160 mg. of pectin, there is added sufficient of the sesame oil containing hydrogenated peanut oil to make 1 cc.

The pectin streptomycin and oils are thoroughly blended in a Waring blendor or similar device and while still at a temperature of approximately 60° C. filled aseptically into cartridges or syringes. Utilizing a preparation of streptomycin in pectin and oil prepared as described above, eighteen patients were treated with 1 cc. each (.42 gram of streptomycin). Blood samples were taken from six patients during the first 8 hours, from six patients from the 12th to 24th hours, and from six patients from the 30th to 48th hours and the samples assayed by the *B. circulans* serial dilution method for their streptomycin content. (The samples were taken in the above manner to avoid bleeding each patient a large number of times). The results obtained are given in the following table where it will be noted that all patients tested had therapeutic concentrations of streptomycin in their blood 48 hours after a single injection of 0.42 gram in the pectin preparation. (It should be pointed out that in contrast to the pectin preparation, a preparation of streptomycin beeswax and oil shortens the activity of streptomycin in the body rather than prolongs it. As a matter of fact, aqueous solutions of streptomycin give a more prolonged therapeutic concentration in the body than do similar amounts of streptomycin in beeswax and oil.)

TABLE SHOWING BLOOD CONCENTRATIONS OF STREPTOMYCIN FOLLOWING A SINGLE INJECTION OF .42 GRAM IN PECTIN AND OIL CONTAINING 5% HYDROGENATED PEANUT OIL

[Micrograms of streptomycin per milliliter serum.]

| | Name | 1 hr. | 4 hr. | 8 hr. |
|---|---|---|---|---|
| 1 | K, M | 10 | 5 | 2.5 |
| 2 | S, C | 5 | 5 | 5 |
| 3 | J, R | 5 | 5 | 5 |
| 4 | W, J | 5 | 5 | 5 |
| 5 | L, J | 10 | 5 | 2.5 |
| 6 | J, A | 10 | 10 | 5 |
| | Average | 7.5 | 5.8 | 4.1 |

| | Name | 12 hr. | 16 hr. | 20 hr. | 24 hr. |
|---|---|---|---|---|---|
| 1 | J, F | 0.156 | 0.156 | .312 | .312 |
| 2 | B, M | 1.25 | 2.5 | 1.25 | .625 |
| 3 | J | 1.25 | 2.5 | 2.5 | 1.25 |
| 4 | N | 0.6 | 2.5 | 1.25 | .625 |
| 5 | L | 2.5 | 2.5 | 2.5 | 1.25 |
| 6 | C | 2.5 | 5.0 | 2.5 | 1.25 |
| | Average | 1.376 | 2.52 | 1.71 | .87 |

| | Name | 30 hr. | 36 hr. | 42 hr. | 48 hr. |
|---|---|---|---|---|---|
| 1 | D | 0.6 | 0.6 | 0.6 | 0.6 |
| 2 | N | 2.5 | 0.6 | 0.6 | 0.6 |
| 3 | W | 0.6 | 0.6 | 0.6 | 0.6 |
| 4 | L | 1.25 | 0.6 | 0.6 | 0.6 |
| 5 | N | 1.25 | 0.6 | 1.25 | 0.6 |
| 6 | B | 0.6 | 0.6 | 0.6 | 0.6 |
| | Average | 1.1 | 0.6 | 0.62 | 0.6 |

From the physical appearance of streptomycin-pectin in oil it seemed that a compound might possibly be formed in the presence of the water of the body tissues since streptomycin is a base and pectin an acid. Such a compound would release the streptomycin as the body broke down the pectin. On this basis a gram of pectin and a gram of streptomycin were placed in solution and allowed to stand one hour. On mixing some heat was evolved. The material was then treated with 3 volumes of 95% ethyl alcohol to precipitate the pectin. A gelatinous material was precipitated and approximately 75% of the streptomycin was found to precipitate with it. This would indicate that either the streptomycin was physically bound or chemically bound to the pectin.

To test the effectiveness of the pectin-streptomycin in aqueous solution in prolonging the action of streptomycin, nine rabbits were injected each with 300,000 micrograms of the solution in a 1 cc. volume. Two kinds of streptomycin were used (crystalline and amorphous) and two concentrations of pectin 2.5% and 1.25%.

The following table shows the results obtained:

TABLE I

*Streptomycin pectin solution, potency 300,000 mcg. per cc.*

[Micrograms per cc. of blood serum.]

| Material Injected | Hours after injection | 18 hrs. | 24 hrs. |
|---|---|---|---|
| | Rabbit #— | | |
| Crystalline Streptomycin plus 1.25% pectin. | IL | 1.55 | 1.4 |
| | IM | 1.65 | 0.79 |
| | IN | 0.26 | 0.25 |
| Average level | | 1.15 | .81 |
| Crystalline Streptomycin plus 2.5% pectin. | IO | 1.27 | .545 |
| | IP | 1.33 | .600 |
| | IQ | 1.07 | .395 |
| Average level | | 1.22 | .51 |
| Amorphous Streptomycin phosphate plus 1.25% pectin. | IR | 3.20 | 2.10 |
| | IS | 2.00 | 0.88 |
| | IT | 1.25 | 0.89 |
| Average level | | 2.15 | 1.29 |

From Table I it appears that a prolongation of the effect of streptomycin in the animal body occurred. As a control streptomycin alone was injected in a concentration of 300,000 mcg. and 600,000 mcg. per cc. into a group of ten rabbits of approximately equal weight. Blood samples were obtained from these rabbits at 18 hours and 24 hours after injection. The results are shown in Table II.

TABLE II

*Streptomycin only, potency 300,000 mcg. per cc.*

[Micrograms per cc. of blood serum.]

| Hours after injection | 18 hrs. | 24 hrs. |
|---|---|---|
| Rabbit #1 | .85 | .30 |
| Rabbit #2 | .75 | .33 |
| Rabbit #3 | 1.15 | .42 |
| Rabbit #4 | .51 | .58 |
| Rabbit #5 | .80 | |
| Rabbit #6 | .88 | .53 |
| Rabbit #7 | 2.00 | .84 |
| Rabbit #8 | .34 | .20 |
| Average level | .91 | .44 |

TWO RABBITS INJECTED WITH 600,000 MCG.

| | | |
|---|---|---|
| Rabbit #9 | 1.7 | .80 |
| Rabbit #10 | 1.75 | 1.05 |
| Average level | 1.73 | .93 |

It will be noted that the average level obtained with streptomycin alone was considerably less at both 18 and 24 hours than the levels obtained with the streptomycin-pectin combination in aqueous solution.

On the basis of the results obtained in animals, human experiments were initiated using three types of streptomycin, i. e., streptomycin sulphate, streptomycin hydrochloride and streptomycin phosphate. The streptomycin salts were prepared as follows:

A 1.25% solution of pectin was prepared by adding for each 100 cc. of distilled water 1.25 grams of pectin. This was placed in solution by whirling in a Waring blendor for fifteen minutes. The solution of pectin in water was then autoclaved under a steam pressure of 15 pounds (120° C.) for twenty minutes for sterilization. After cooling to room temperature, each of the three salts was added to the pectin solution to make a concentration of 0.4 gram of streptomycin activity in each one cc. of pectin solution.

A considerable amount of heat was evolved on mixing the streptomycin with the pectin solution. The heat evolved, apparently one of chemical inter-reaction between the pectin and streptomycin, appeared to be greatest with streptomycin phosphate. The fact that heat is evolved on mixing these substances, that on precipitation with alcohol of the pectin, streptomycin is also precipitated (alcohol will not precipitate streptomycin from solution) and prolongation of streptomycin activity is obtained in the animal body with this preparation, all offer evidence to support the idea that a chemical compound is obtained on mixing in aqueous solution pectin and streptomycin.

The preparation described above was then added aseptically to 20 cc. vials for dispensing and checked for sterility. After determining that the product was sterile, a group of patients were injected at the clinic with this material in a dose of 1.0 cc. per patient and blood samples taken at intervals to determine whether a prolongation of activity could be obtained. The results are shown in Table III.

TABLE III

STREPTOMYCIN, 0.4 GM. PER PATIENT 6-20-47 Streptomycin 400,000 mcg./ml. aqueous pectin 12.5 mg./ml·three salts of streptomycin and two methods of assay used

[Micrograms per cc. of blood serum.]

*B. CIRCULANS SERIAL DILUTION*

| | | 12 hour | 16 hour | 20 hour | 24 hour |
|---|---|---|---|---|---|
| A | PO$_4$ | 2.5 | 1.25 | .6 | .6 |
| B | HCl | 1.25 | 0.6 | .6 | .3 |
| C | PO$_4$ | 5.0 | 5.0 | .125 | .6 |
| D | HCl | 2.5 | 1.25 | .6 | .6 |
| E | SO$_4$ | 5.0 | 1.25 | .6 | .3 |
| F | SO$_4$ | 2.5 | 1.25 | .6 | .6 |

*B. SUBTILIS PLATE*

| | | 12 hour | 16 hour | 20 hour | 24 hour |
|---|---|---|---|---|---|
| A | PO$_4$ | 1.5 | .84 | .5 | .32 |
| B | HCl | 1.0 | .36 | .29 | .20 |
| C | PO$_4$ | 2.1 | .96 | .53 | .3 |
| D | HCl | 1.8 | .84 | .63 | .3 |
| E | SO$_4$ | 2.2 | 1.06 | .70 | .4 |
| F | SO$_4$ | 1.5 | .78 | .36 | .2 |

6-23-47 *B. CIRCULANS SERIAL DILUTION*

| | | 12 hour | 16 hour | 20 hour | 24 hour |
|---|---|---|---|---|---|
| G | HCl | .6 | .6 | .6 | .3 |
| H | SO$_4$ | 1.25 | .6 | .6 | .6 |
| I | HCl | 1.25 | .6 | .6 | .3 |
| J | SO$_4$ | .6 | .6 | .6 | .6 |

*B. SUBTILIS PLATE*

| | | 12 hour | 16 hour | 20 hour | 24 hour |
|---|---|---|---|---|---|
| G | HCl | .92 | .37 | .22 | .19 |
| H | SO$_4$ | 1.8 | .92 | .53 | .40 |
| I | HCl | 1.46 | .60 | .31 | .17 |
| J | SO$_4$ | .88 | .34 | .17 | (1) |

[1] Too low.
PO$_4$—Streptomycin phosphate.
HCl—Streptomycin hydrochloride.
SO$_4$—Streptomycin sulfate.

It will be noted from the table that all patients injected with approximately 400,000 micrograms (.4 of a gram) of streptomycin-pectin in solution, whether the salt was the phosphate, hydrochloride or the sulfate, showed streptomycin in their blood stream twenty-four hours after injection. Thus, it is possible with this preparation to obtain therapeutic levels of streptomycin in the blood for this period thus obviating the necessity for frequent injections during the day.

Several points are listed below concerning this preparation:

1. Streptomycin-pectin in solution in water forms a clear, easily injectable solution and may be injected with any type of syringe.

2. The evidence appears to indicate that the streptomycin-pectin in solution forms a compound under the conditions set up herein for its preparation.

3. Although 1.25% and 2.5% pectin have been utilized, 5%, 10%, and 15% solutions have been prepared by proper treatment with steam under pressure. A 5% concentration of pectin in solution is an extremely stiff gelatinous mass which cannot be injected as such, but on treatment with steam under pressure (autoclaved) the pectin molecule is reduced in size and a treatment consisting of steam pressure of fifteen pounds for twenty minutes causes a 5% heavy gelatinous mass to become liquid and thus utilizable in a syringe.

4. In view of the fact that streptomycin is a base and pectin is an acid, the steam treatment of pectin and reduction in size of the molecule results in the formation of more radicals available for attachment to the streptomycin. It is felt that within limits the more pectin that can be utilized in this preparation the more efficient the preparation will be in prolonging the blood levels of streptomycin.

5. Streptomycin-pectin in solution may be prepared in multiple-dose containers for dispensing by physicians.

6. The preparation of streptomycin-pectin in solution is extremely simple since it entails autoclaving the pectin in water solution for a definite period of time followed by the addition aseptically of one of the streptomycin salts.

7. Preliminary stability data carried out at temperatures of 25° C., 37° C., and 56° C. indicate that the product is stable and does not lose potency over a period of at least one week at a temperature as high as 56° C.

8. If it is found that the stability of this preparation is not as great as anticipated, the preparation could be prepared in a so-called "combination package." Such a package would consist of a solution, e. g., of 10% pectin sterilized by treatment in the autoclave in one vial and one gram of streptomycin in the second vial. The physician would then mix the two vials before use by placing the pectin solution in the dry streptomycin salt aseptically with a sterile syringe.

9. It should be noted in Tables I and II that the streptomycin-pectin in aqueous solution in which 300,000 micrograms of streptomycin was incorporated gave blood levels in rabbits of approximately the same height as 600,000 micrograms of streptomycin alone.

The invention described herein may be manufactured and used by or for the Government of the United States for governmental purposes without the payment to me of any royalty thereon in accordance with the provisions of the Act of April 30, 1928 (Ch. 460, 45 Stat. L. 467).

I claim:

1. An injectable dry therapeutic composition comprising the combination of an innocuous oil having colloidal pectin dispersed therein, with a solid, finely-divided drug of a particle size of about 50 to 100 microns normally tending to settle out of suspension, and hydrogenated peanut oil as a suspension stabilizer.

2. An injectable dry therapeutic composition comprising the combination of peanut oil having colloidal pectin dispersed therein, with a solid, finely-divided penicillin of a particle size of about 50 to 100 microns normally tending to settle out of suspension, and hydrogenated peanut oil as a suspension stabilizer.

3. An injectable dry therapeutic composition comprising the combination of peanut oil having colloidal pectin dispersed therein, with solid, finely-divided streptomycin of a particle size of about 50 to 100 microns normally tending to settle out of suspension, and hydrogenated peanut oil as a suspension stabilizer.

4. An injectable dry therapeutic composition consisting of, per cubic centimeter, the combination of a peanut oil vehicle having about 270 mg. of colloidal pectin dispersed therein with about 300,000 units of finely-divided penicillin having a particle size of about 50 to 100 microns normally tending to settle out, and between five and ten percent of hydrogenated peanut oil as a suspension stabilizer.

HENRY WELCH.

REFERENCES CITED

The following references are of record in the file of this patent:

UNITED STATES PATENTS

| Number | Name | Date |
|---|---|---|
| 2,055,083 | Klein | Sept. 22, 1936 |
| 2,413,419 | Saunders | Dec. 31, 1946 |

OTHER REFERENCES

Science, Sept. 1, 1944, pages 196 to 198.

Zimmamon, Venereal Disease Information, February 1945, page 31.

Lloyd Jones, The Lancet, April 13, 1946, page 526.

Raiziss, Science, November 3, 1944, pages 412 and 413.

Hobby et al., Proc. Soc. Exptl. Biol. & Med., June 1942, page 286.

Science News Letter, October 4, 1947, page 210.

J. Amer. Pharm. Assoc., Sci. Ed., Jan. 1948, pages 21 to 23.